US009118523B2

(12) United States Patent
Su et al.

(10) Patent No.: US 9,118,523 B2
(45) Date of Patent: Aug. 25, 2015

(54) SIGNAL RECEIVING APPARATUS AND SIGNAL RECEIVING METHOD

(71) Applicant: MStar Semiconductor, Inc., Hsinchu Hsien (TW)

(72) Inventors: Yu-Che Su, Hsinchu Hsien (TW); Tai-Lai Tung, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 34 days.

(21) Appl. No.: 13/956,545

(22) Filed: Aug. 1, 2013

(65) Prior Publication Data

US 2014/0192930 A1 Jul. 10, 2014

(30) Foreign Application Priority Data

Jan. 7, 2013 (TW) ............................... 102100430 A

(51) Int. Cl.
H04L 25/06 (2006.01)
(52) U.S. Cl.
CPC .................................... H04L 25/061 (2013.01)

(58) Field of Classification Search
CPC ........................................ H04L 25/061–25/064
USPC .......................... 375/319; 455/232.1; 327/307
See application file for complete search history.

(56) References Cited

U.S. PATENT DOCUMENTS

2002/0042256 A1* 4/2002 Baldwin et al. ............. 455/232.1
2007/0296481 A1* 12/2007 Hayakawa .................... 327/307

* cited by examiner

Primary Examiner — Daniel Washburn
Assistant Examiner — Fitwi Hailegiorgis
(74) Attorney, Agent, or Firm — WPAT, PC; Justin King

(57) ABSTRACT

A signal receiving apparatus, applicable in a wireless system calibrating direct current offset, includes: an adjusting circuit arranged to receive an receiving signal having a first DC (Direct Current) signal, and adjust the first DC signal to generate the receiving signal having a second DC signal according to an adjusting signal; a first arithmetic circuit arranged to generate an error signal according to the second DC signal and a target DC signal; and a second arithmetic circuit arranged to calculate an error signal slope according to the error signal, and update the adjusting signal according to the error signal slope and the error signal.

20 Claims, 6 Drawing Sheets

SIGNAL RECEIVING APPARATUS AND SIGNAL RECEIVING METHOD

CROSS REFERENCE TO RELATED APPLICATIONS

This application claims priority under 35 U.S.C 119 to Taiwan patent application, TW102100430, filed on Jan. 7, 2013, the disclosure of which is incorporated herein by reference.

BACKGROUND OF THE INVENTION

1. Field of the Invention

The present invention relates to a signal receiving apparatus and a signal receiving method, and more particularly, to a signal receiving apparatus capable of calibrating direct current offset and an associated method thereof.

2. Description of the Prior Art

In a wireless communication system, the broader dynamic range of signal which a receiver can cover, the better the performance the receiver is considered to have. However, due to inconsistency of DC (direct current) biases among various functional circuits, DC offset phenomenon often occurs in the wireless receiver system. This not only affects the informational integrity of the received signal, but DC offset phenomenon also constrains the dynamic range of signal the receiver can cover. Therefore, there exists an urgent need for implementing an efficient method for calibrating DC offset phenomenon in wireless receiver.

SUMMARY OF THE INVENTION

Thus, one objective of the present invention is to provide a signal receiving apparatus capable of calibrating DC offset and method thereof.

According to a first embodiment of the present invention, a signal receiving apparatus applicable in a wireless system is provided. The signal receiving apparatus comprises an adjustment circuit, a first calculation circuit, and a second calculation circuit. The adjustment circuit is configured to receive a received signal having a first DC signal and to adjust the first DC signal according to an adjustment signal to generate the received signal having a second DC signal. The first calculation circuit is configured to generate an error signal according to the second DC signal and a target DC signal. The second calculation circuit is configured to calculate a change rate according to the error signal and to update the adjustment signal according to the change rate and the error signal.

According to a second embodiment, a signal receiving method applicable to a wireless system is provided. The signal receiving method comprises: receiving a received signal having a first DC signal and adjusting the first DC signal according to an adjustment signal to generate the received signal having a second DC signal; generating an error signal according to the second DC signal and a target DC signal; and calculating a change rate according to the error signal and updating the adjustment signal according to the change rate and the error signal.

The embodiments of the present invention adjust the DC signal of a received signal by calculating the error and change rate between the DC signal of received signal and a target DC signal. Hence, the error between the DC signal of received signal and the target DC signal can be converged quickly to achieve DC offset compensation. As a result, the DC offset phenomena of the signal receiving apparatus in accordance with the present invention is improved.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
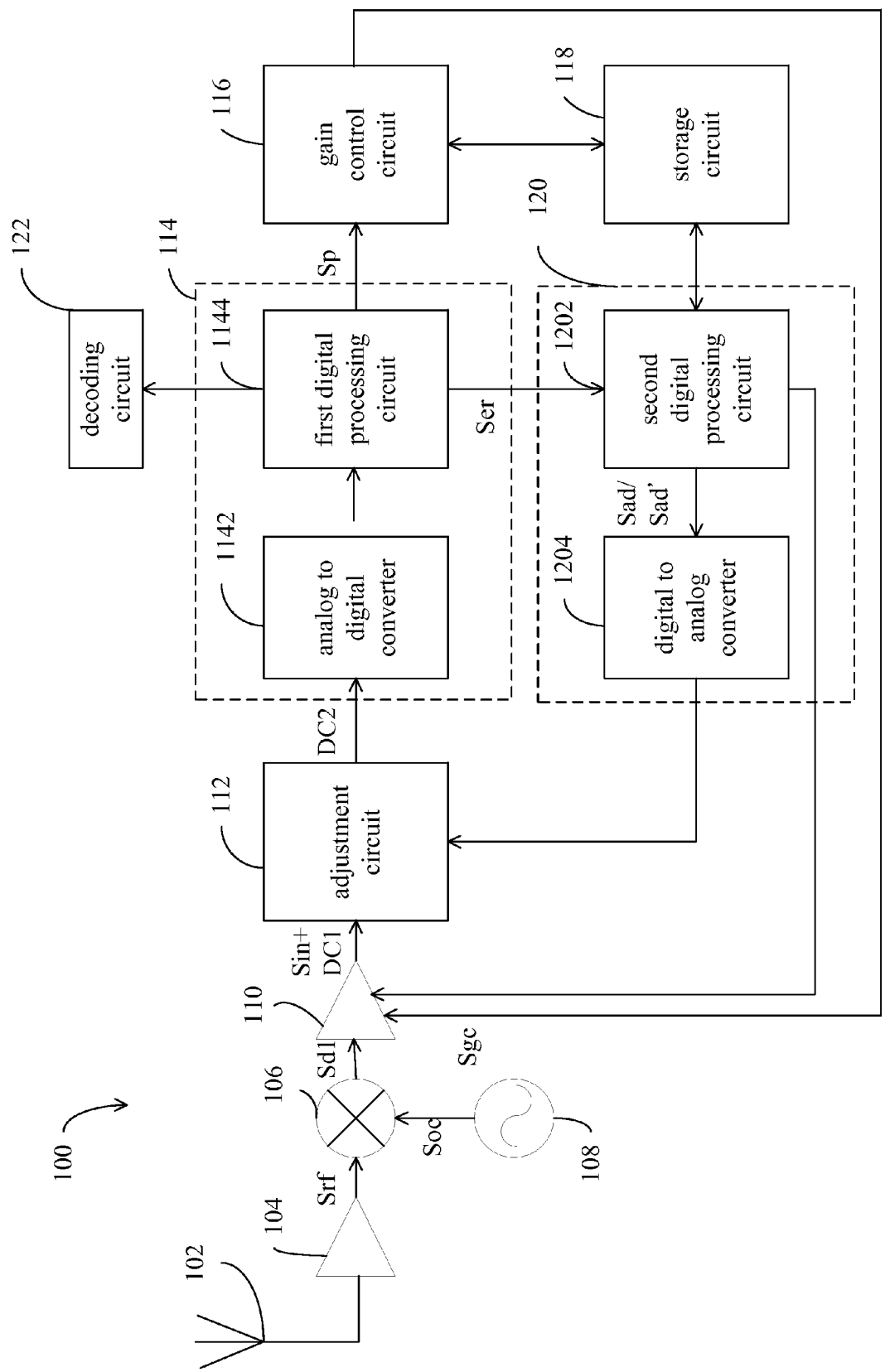
FIG. 1 illustrates a schematic block diagram of an embodiment of a signal receiving apparatus in accordance with the present invention.

FIG. 1 illustrates a schematic block diagram of an embodiment of a signal receiving apparatus 100 in accordance with the present invention. The signal receiving apparatus 100 may be applicable in a wireless system. The signal receiving apparatus 100 comprises an antenna 102, a low noise amplifier 104, a mixer 106, an oscillator 108, a variable gain amplifier 110, an adjustment circuit 112, a first calculation circuit 114, a gain control circuit 116, a storage circuit 118, a second calculation circuit 120, and a decoding circuit 122. The antenna 102 is configured to receive a wireless signal Sr. The low noise amplifier 104, coupled to the antenna 102 and the mixer 106, is configured to perform low noise amplification to the wireless signal Sr in order to generate a radio frequency signal Srf to the mixer 106. The mixer 106 coupled to the oscillator 108 and the variable gain amplifier 110 is configured to generate a first down-converted signal Sd1 according to the radio frequency signal Srf and an oscillation signal Soc. The variable gain amplifier 110 coupled to the adjustment circuit 112 and the gain control circuit 116 is configured to apply gain control to the first down-converted signal Sd1 according to a gain control signal Sgc in order to generate a received signal Sin. The adjustment circuit 112 coupled to the first and the second calculation circuits 114 and 120 is configured to receive the received signal Sin having a first DC signal DC1 and to adjust the first DC signal DC1 according to an adjustment signal Sad in order to generate the received signal having a second DC signal DC2. The first calculation circuit 114 coupled to the gain control circuit 116, the storage circuit 118, and the second calculation circuit 120, is configured to generate an error signal Ser according to the second DC signal DC2 and a target DC signal DCA. The second calculation circuit 120 coupled to the first calculation circuit 114 and the adjustment circuit 112 is configured to calculate a change rate or a slope Serr according to the error signal Ser and to generate an updated adjustment signal Sad' according to the change rate Serr and the error signal Ser. The gain control circuit 116 coupled to the first calculation circuit 114, the storage circuit 118, and the variable gain amplifier 110, is configured to generate the gain control signal Sgc according to an input power level signal Sp which could be viewed as the power of the received signal Sin.

The first calculation circuit 114 comprises an analog to digital converter 1142 and a first digital processing circuit 1144. The analog to digital converter 1142 coupled to the adjustment circuit 112 is configured to convert the second DC signal DC2 from analog form to digital form. The first digital processing circuit 1144 coupled to the analog to digital converter 1142 is configured to calculate the error between the second DC signal DC2 and the target DC signal DCA.

The second calculation circuit 120 comprises a second digital processing circuit 1202 and a digital to analog converter 1204. The second digital processing circuit 1202 coupled to the first digital processing circuit 1144 is configured to calculate the change rate Serr according to the error signal and to generate the updated adjustment signal Sad' according to the change rate Serr and the error signal Ser. Digital to analog converter 1204 coupled to the adjustment circuit 112 is configured to convert the updated adjustment signal Sad' from digital form to analog form and to transmit the updated adjustment signal Sad' in analog form to the adjustment circuit 112.

In this embodiment, the signal receiving apparatus 100 according to the present invention has two operating modes, open loop calibration mode and close loop calibration mode, in performing DC offset calibration process. Basically, the signal receiving apparatus 100 enters the open loop calibration mode first and switches to the close loop calibration mode when an external wireless signal is received and processed. At the beginning, when the signal receiving apparatus 100 starts to operate (e.g. starting up or receiving a new packet), it enters the open loop calibration mode. In this mode, the antenna 102, the low noise amplifier 104, the mixer 106, and the oscillator 108 of the signal receiving apparatus 100, are turned off or disabled. Additionally, the variable gain amplifier 110, the adjustment circuit 112, the first calculation circuit 114, the gain control circuit 116, the storage 118, and the second calculation circuit 120, are turned on or enabled. In other words, when the signal receiving apparatus stays in the open loop calibration mode, no external wireless signal is received. In the contrary, when the signal receiving apparatus stays in the close loop calibration mode, external wireless signal is received. Hence, when the signal receiving apparatus 100 stays in the open loop calibration mode, the DC offset phenomena to be calibrated is caused by the DC bias errors in between the variable gain amplifier 110 and the analog to digital converter 1142. When the signal receiving apparatus 100 stays in the close loop calibration mode, the DC offset phenomena to be calibrated is caused by the DC bias errors in between the low noise amplifier 104, the mixer 106, the variable gain amplifier 110, and the analog to digital converter 1142, as well as the oscillation signal Soc generated by the oscillator 108 coupling to the antenna 102. In other words, when the signal receiving apparatus 100 is in the close loop calibration mode, the DC offset to be calibrated is the DC offset phenomena occurs when the signal receiving apparatus 100 receives wireless signal. Thus, in another embodiment of the present invention, the open loop calibration mode could be omitted or only the close loop calibration mode is needed to perform the DC offset calibration process. After reading the operation detail of the signal receiving apparatus 100 in accordance with the present invention, personnel ordinary skilled in the art should understand the operational detail of the another embodiment. Hence the operational detail of this another embodiment is not duplicated herein for the sake of brevity.

At the beginning, when the signal receiving apparatus 100 is operating in the open loop calibration mode, the first downconverted signal Sd1 shown in FIG. 1 could be disregarded because the antenna 102, the low noise amplifier 104, the mixer 106, and the oscillator 108 are turned off at this moment. At the same time, the gain control circuit 116 outputs the gain control signals Sgc corresponding to different input power levels to the variable gain amplifier 110 for controlling it to output different signals corresponding to different gain settings to the first calculation circuit 114, respectively. Please be aware that the second calculation circuit 120 does not generate the adjustment signal Sad at this moment. The output signal of the variable gain amplifier 110 could be viewed as the DC offset in between the variable gain amplifier 110 and the analog to digital converter 1142. Hence, in the open loop calibration mode, when the variable gain amplifier 110 outputs different signals corresponding to different gain settings to the analog to digital converter 1142, the analog to digital converter 1142 can convert the signals outputted from the variable gain amplifier 110 from analog form to digital form and stores them in the storage circuit 118. As a result, when the open loop calibration mode is finished, the different DC offsets or corresponding calibration values in between the variable gain amplifier 110 and the analog to digital converter 1142 can be stored in the storage circuit 118 in advance. It is worth noting that the gains and the corresponding DC offsets are stored in a form of one-to-one mapping pairs in the storage circuit 118. When the signal receiving apparatus 100 receives real wireless signals, the gain control circuit 116 controls the storage circuit 118 for outputting the corresponding DC offset according to the input power level signal Sp of the received signal Sin such that the adjustment circuit 112 can compensate the DC offset of the received signal Sin according to the corresponding DC offset.

When the open loop calibration mode finishes, the signal receiving apparatus 100 enters the close loop calibration mode. In this mode, the signal receiving apparatus 100 receives the wireless signal Sr external to the chip. Already mentioned in the paragraphs above, the DC offset phenomena occurs to the signal receiving apparatus 100 further comprises the DC offset in between the low noise amplifier 104 and the mixer 106 as well as the oscillation signal Soc coupling to the antenna 102. At the moment, the signal receiving apparatus 110 switches to the close loop calibration mode to calibrate the DC offset caused by the variable gain amplifier 110 in different gain settings and to update the DC offsets or corresponding calibration values corresponding to the different gain settings stored in the storage circuit 118.

Figure 2:
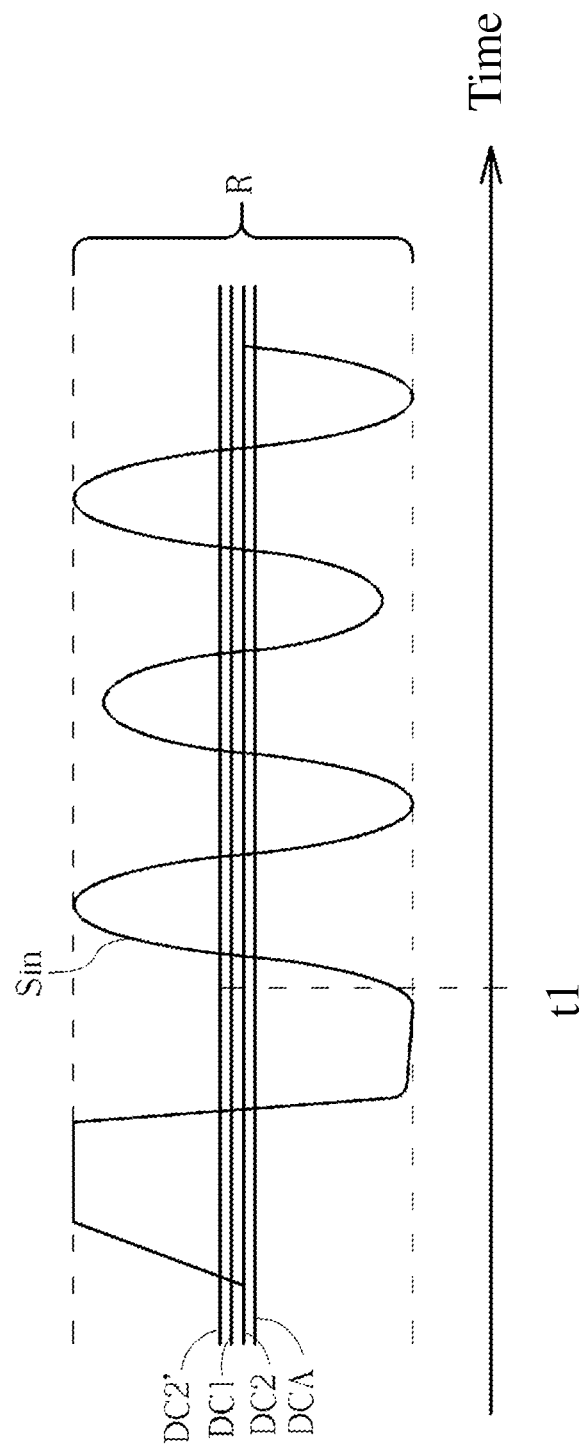
FIG. 2 is a timing diagram of the received signal Sin, the first DC signal of the received signal Sin, the second DC signal outputted from the adjustment circuit, the target DC signal, and the dynamic input range of the analog to digital converter in one embodiment of the signal receiving apparatus in the open loop calibration mode according to the present invention.

In the close loop calibration mode, the first calibration circuit 114 of the embodiment can be used to calculate the output power of the received signal Sin outputted from the adjustment circuit 112 in order to generate the input power level signal Sp corresponding to the input power to the gain control circuit 116. The gain control circuit 116 generates the gain control signal Sgc according to the input power level signal Sp in order to control the variable gain amplifier 110 for amplifying the first down converted signal Sd1 by applying an appropriate gain setting. When applying the appropriate gain setting, all amplitudes of the received signal Sin fall into the dynamic receiving range of the analog to digital converter 1142. On the other hand, the gain control circuit 116 further controls the storage 118 for outputting the DC offset corresponding to the input power level signal Sp such that the adjustment circuit 112 can output preliminary calibration signal to calibrate the DC offset of the received signal Sin. As a consequence, when the variable gain amplifier 110 can apply the appropriate gain setting to amplify the first down converted signal Sd1, the DC bias of the output signal of the variable gain amplifier 110 is approximately closed to the DC bias of the analog to digital converter 1142 as shown in FIG. 2. FIG. 2 is a timing diagram of the received signal Sin, the first DC signal DC1 of the received signal Sin, the second DC signal DC2 outputted from the adjustment circuit 112, the target DC signal DCA, and the dynamic input range R of the analog to digital converter 1142 in one embodiment of the signal receiving apparatus 100 in the open loop calibration mode according to the present invention. It is worth noting that before the timing point t1, some amplitudes of the received signal Sin may extend beyond the dynamic input range R of the analog to digital converter 1142; after the timing point t1, the gain control circuit 116 is able to control the variable gain amplifier 110 for adjusting all of amplitudes of the received signal Sin into the dynamic input range R of the analog to digital converter 1142.

Besides, the voltage difference between the first DC signal DC1 of the received signal Sin and the DC bias signal, i.e., DCA, of the analog to digital converter 1142 can be viewed as the DC offset in between the variable gain amplifier 110 and the analog to digital converter 1142. In the open loop calibration mode, the signal receiving apparatus 100 calibrates the first DC signal DC1 of the received signal Sin to the second DC signal DC2. The purpose of switching to the close loop calibration mode by the signal receiving apparatus 100 is to calibrate the second DC signal SC2 of the received signal Sin to the target DC signal DCA, i.e., the DC bias of the analog to digital converter 1142. When the signal receiving apparatus 100 switches to the close loop calibration mode, the second DC signal DC2 of the received signal, Sin is not always closer to the target DC signal DCA. It is possible that the second DC signal DC2 of the received signal Sin is further to the target DC signal DCA, as the second DC signal DC2' above the first DC signal DC1 as shown in FIG. 2.

Nevertheless, when the signal receiving apparatus 100 switches to the close loop calibration mode, the analog to digital converter 1142 of the first calibration circuit 114 converts the second DC signal DC2 of the received signal Sin from analog form to digital form. After that, the first digital processing circuit 1144 calculates the error between the second DC signal DC2 and the target DC signal DCA in order to generate the error signal Ser. Ideally, when the signal receiving apparatus 100 calculates the error signal Ser, the adjustment circuit 112 can adjust the first DC signal of the received signal Sin accordingly such that the second DC signal DC2 of the received signal Sin approximately equals to the target DC signal DCA. However, because there is a delay in the operation of the first calculation circuit 114, the error signal Ser calculated by the first calculation circuit 114 may not be the error of the current second DC signal DC2 and the target DC signal DCA. If compensating the current second DC signal DC2 directly according to the error signal Ser calculated by the first calculation circuit 114, it is possible that the error signal becomes bigger, i.e., the error signal is diverged such as the second DC signal DC2'.

Therefore, the signal receiving apparatus 100 adopts a second stage circuit, the second calculation circuit 120, to calculate the slope of the error signal Ser or a change rate Serr in order to generate the updated adjustment signal Sad' to adjust the second DC signal DC2 of the received signal Sin.

As a result, the signal receiving apparatus 100 is able to compensate and converge the error between the second DC signal DC2 of the current received signal Sin and the target DC signal DCA quickly. Moreover, when the first digital processing circuit 1144 calculates the error signal Ser between the second DC signal DC2 and the target DC signal DCA, the second digital processing circuit 1202 calculates the change rate Serr according to the error signal Ser and generates the updated adjustment signal Sad' according to the change rate Serr and the error signal Ser. The digital to analog converter 1204 is configured to convert the updated adjustment signal Sad' from digital form to analog form and transmits the updated adjustment signal Sad' in analog form to the adjustment circuit 112. Accordingly, the adjustment 112 uses the updated adjustment signal Sad' to adjust the second DC signal DC2 of the received signal Sin.

Figure 3:
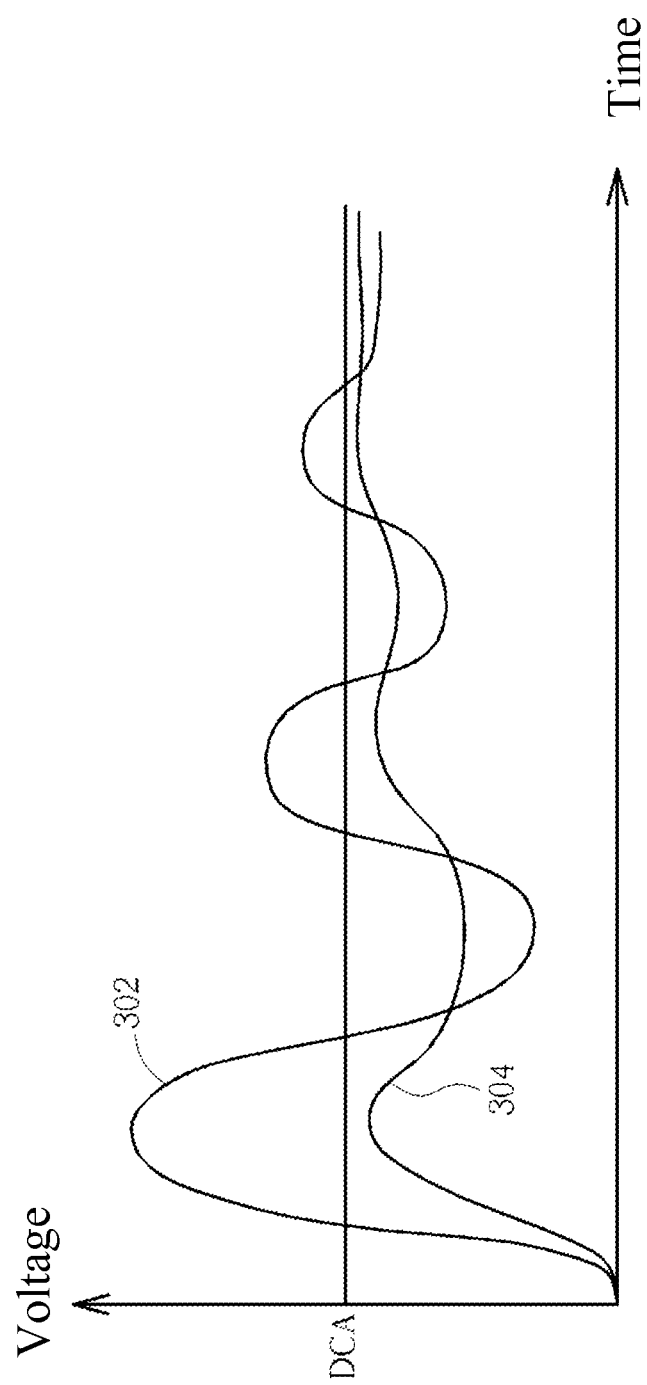
FIG. 3 illustrates a timing diagram of the second DC signal and the target DC signal of two embodiments of the signal receiving apparatus in the close loop calibration mode in accordance with the present invention.

Furthermore, the operations of the first calculation circuit 114 and the second calculation circuit 120 can be equivalent to the following equation (1):

$$E = k_i \int e_i + k_p e_i + k_d \frac{de_i}{dt} \quad (1)$$

where $e_i$ represents the error between the second DC signal DC2 of the received signal Sin and the target DC signal DCA, $k_i$ represents the integral calculus parameter to the error $e_i$, $k_p$ represents the gain parameter to the error $e_i$, and $k_d$ represents the differential calculus parameter to the error $e_i$. Hence the first calculation circuit 114 and the second calculation circuit 120 can adjust the parameters $k_i$, $k_p$, and $k_d$ to calculate the change of the error between the second DC signal DC2 and the target DC signal DCA in order to output the updated adjusted signal Sad' to the adjustment circuit 112. In this embodiment, different parameters $k_i$, $k_p$, and $k_d$ will lead to different convergence times of the second DC signal DC2 as shown in FIG. 3. FIG. 3 illustrates a timing diagram of the second DC signal DC2 and the target DC signal DCA of two embodiments of the signal receiving apparatus 100 in the close loop calibration mode in accordance with the present invention. The curve 302 represents a first embodiment using a first set of parameters $k_i$, $k_p$, and $k_d$ to calibrate the second DC signal DC2 of the received signal Sin. The curve 304 represents a second embodiment using a second set of parameters $k_i$, $k_p$, and $k_d$ to calibrate the second DC signal DC2 of the received signal Sin. As shown in FIG. 3, the amplitude change with time of the curve 302 is larger than the curve 304 because both of the parameters $k_p$ and $k_d$ of the curve 302 are larger than the parameters $k_p$ and $k_d$ of the curve 304, respectively. Additionally, the parameter $k_i$ of the curve 302 is smaller than the parameter $k_i$ of the curve 304. Personnel ordinary skilled in the art can adjust the parameters $k_i$, $k_p$, and $k_d$ to get desired amplitude changes according to any specific requirement.

Thus, the second calculation circuit 120 generates the updated adjustment signal Sad' according to the error $e_i$, the differential calculus of the error $e_i$, and the integral calculus of the error $e_i$. Consequently, the second calculation circuit 120 can compensate the delay time caused by the first calculation circuit 114 to correctly calculate the error between the current DC signal and the target DC signal DCA. After repeated calibrations, when the second DC signal DC2 approximately equals to the target DC signal, the second calculation circuit 120 stores a reference corresponding to the updated adjustment signal Sad' in the storage circuit 118 in order to replace the DC offset corresponding to the input power and stops the calibration process corresponding to the input power level. After that, when the input power of a second down converted signal received by the signal receiving apparatus 100 passing through the variable gain amplifier 110 and the adjustment circuit 112 equals to the input power of the first down converted signal Sd1 passing through the variable gain amplifier 110 and the adjustment circuit 112, it is assumed that the input power of the second down converted signal equals to the input power of the first down converter signal Sd1. At this time, the gain control circuit 116 controls the storage circuit 118 according to the input power signal corresponding to the input power in order to output the reference value of the updated adjustment signal Sad' to the second calculation circuit 120. As a result, the second calculation circuit 120 generates the updated adjustment signal Sad' directly according to the reference value, i.e., the calibration value.

Figure 4:
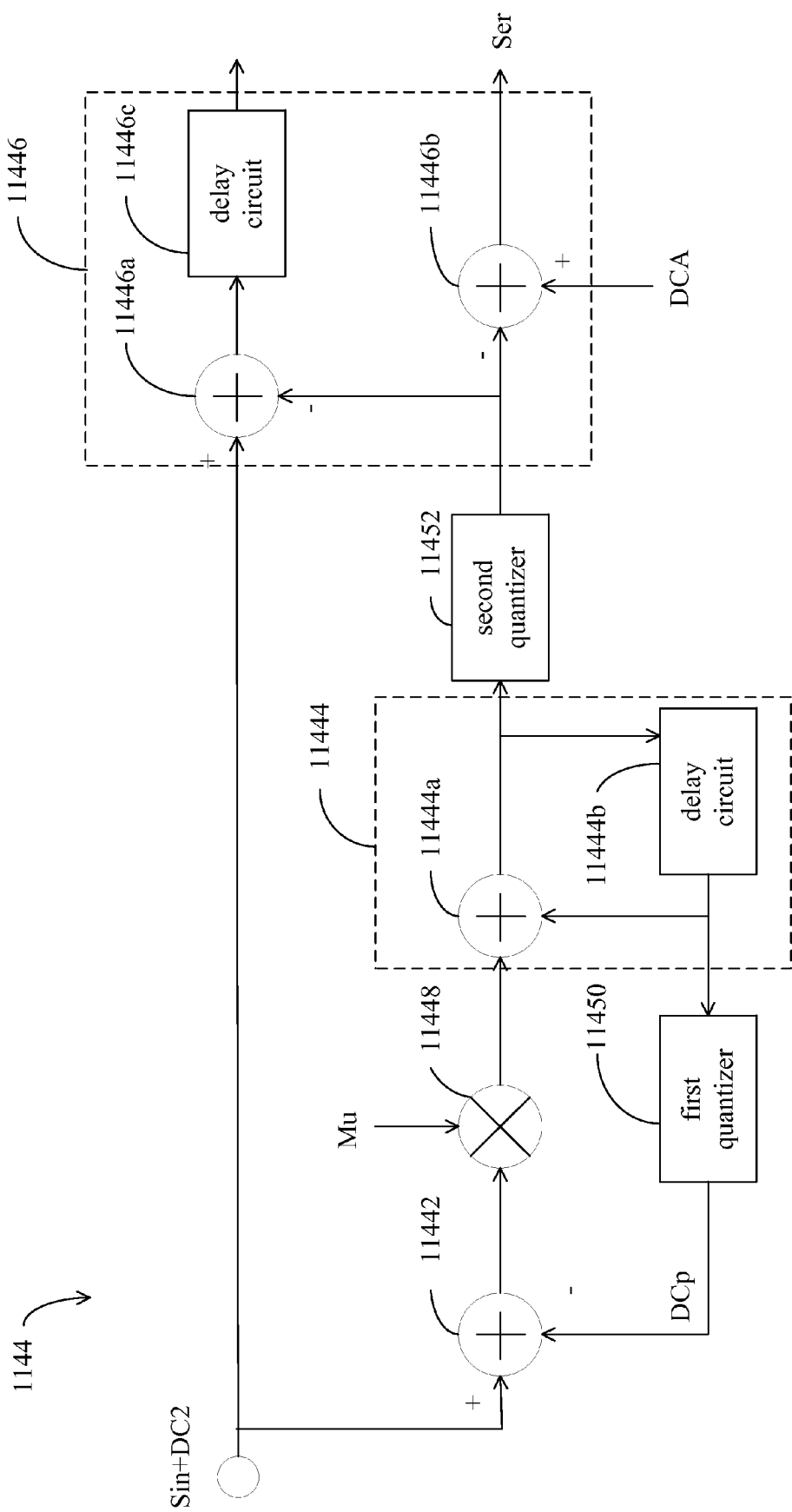
FIG. 4 depicts a schematic block diagram of a first digital processing circuit according to an embodiment of the present invention.

Please refer to FIG. 4, which depicts a schematic block diagram of a first digital processing circuit 1144 according to an embodiment of the present invention. The first digital processing circuit 1144 comprises a first logic circuit 11442, a second logic circuit 11444, a third logic circuit 11446, a multiplier 11448, a first quantizer 11450, and a second quantizer 11452. The first logic circuit 11442 is configured to generate a differential calculus signal according to the second DC signal DC2 and a prior DC signal DCp. The second logic circuit 11444 coupled to the first logic circuit 11442 is configured to perform integral calculus on the differential calculus signal in order to generate an integral calculus signal and the prior DC signal DCp. The third logic circuit 11446 coupled to the second logic circuit 11446 coupled to the second logic circuit 11444 is configured to generate the error signal Ser according to the integral signal and the target DC signal DCA. The first logic circuit 11442 is a minus operator which performs subtracting of the prior DC signal DCp from the second DC signal DC2 to generate the differential calculus signal. The third logic circuit 11446 comprises a first minus operator 11446a, a second minus operator 11446b, and a delay circuit 11446c. The second minus operator 11446b generates the error signal Ser to the second digital processing circuit 1202 by subtracting the target DC signal DCA from the integral signal. The first minus operator 11446a generates a data signal to the decoding circuit 112 by subtracting the integral signal from the current data signal Sin+DC2 having the second DC signal. The second logic circuit 11444 comprises a minus operator 11444a and a delay circuit 11444b interconnected as shown in FIG. 4. In addition, the multiplier 11448 is configured to multiply the differential signal with a parameter Mu. The first quantizer 11450 is configured to quantize the first DC signal DCp. The second quantizer 11452 is configured to quantize the integral signal. In short, the first digital processing circuit 1144 can be viewed as an infinite impulse response (IIR) filter.

Figure 5:
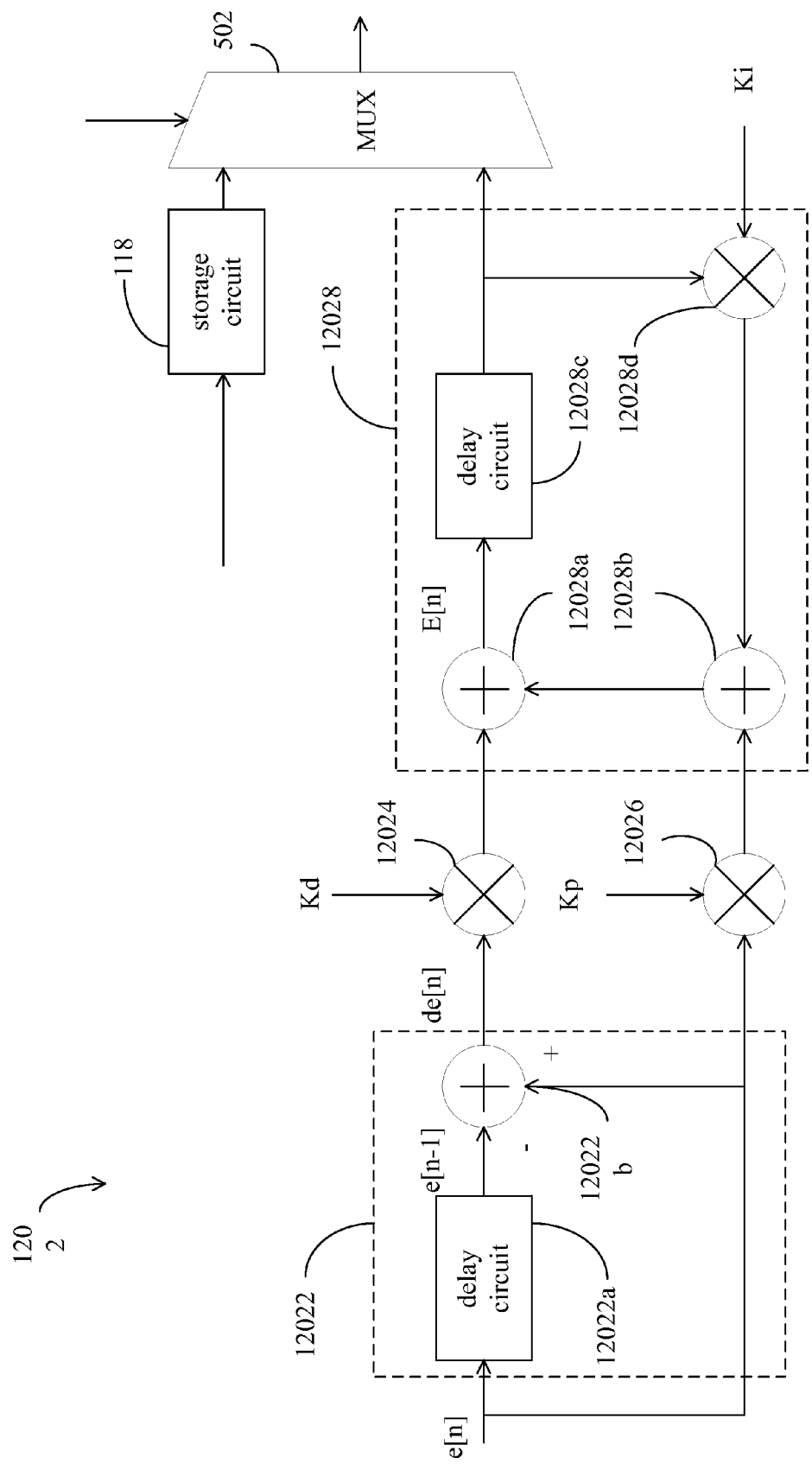
FIG. 5 depicts a schematic block diagram of an embodiment of a second digital processing circuit in accordance with the present invention.

Please refer to FIG. 5, which depicts an embodiment of a second digital processing circuit 1202 in accordance with the present invention. The second digital processing circuit 1202 comprises a first logic circuit 12022, a second logic circuit 12024, a third logic circuit 12026, and a fourth logic circuit 12028. The first logic circuit 12022 is configured to generate the change rate de[n] according to the error signal e[n], i.e., Ser, from the first digital processing circuit 1144 and a prior error signal e[n−1]. The second logic circuit 12024 coupled to the first logic circuit 12022 is configured to generate an adjusted change rate according to the change rate de[n] and the parameter $k_d$. The third logic circuit 12026 is configured to generate an adjusted error signal according to the error signal e[n] and the parameter $k_p$. The fourth logic circuit coupled to the second logic circuit 12024 and the third logic circuit 12026 is configured to generate E[n] value denoted in equation (1) according to the error signal e[n], the adjusted change rate, the adjusted error signal, and the parameter $k_i$. The value of E[n] is used to generate the updated adjustment signal Sad'. Moreover, the first logic circuit 12022 comprises a delay circuit 12022a and a minus operator 12022b. The delay circuit 12022a is configured to delay the error signal e[n] in order to generate the prior error signal e[n−1]. The minus operator 12022b is configured to subtract the prior error signal e[n−1] from the error signal e[n] in order to generate the change rate de[n]. The second logic circuit 12024 is a multiplier configured to multiply the change rate de[n] with the parameter $k_d$ in order to generate the adjusted change rate. The third logic circuit 12026 is a multiplier configured to multiply the error signal e[n] with the parameter $k_p$ to generate the adjusted error signal. The fourth logic circuit 12028 is configured to perform integral calculus on the error signal e[n] in order to generate an integral calculus signal, i.e., $\int e_i$ in equation (1). The fourth logic circuit 12028 further accumulates the adjusted integral calculus signal, i.e., $k_i \int e_i$ in equation (1), the adjusted change rate, i.e., $$k_d \frac{de_i}{dt}$$

in equation (1), and the adjusted error signal, i.e., $k_p e_i$ in equation (1), in order to generate the updated adjustment signal Sad'. The fourth logic circuit 12028 comprises a first adder 12028a, a second adder 12028b, a delay circuit 12028c, and a multiplier 12028d interconnected as shown in FIG. 5. Besides, the values of de[n] and E[n] could be represented in the following equations (2) and (3) respectively.

$$de[n]=e[n]-e[n-1] \quad (2)$$

$$E[n]=k_p e[n]+k_i E[n-1]+k_d de[n] \quad (3)$$

In order to more clearly describe the embodiment of the second calculation circuit 120, FIG. 5 additionally depicts the storage circuit 118 and a multiplexer 502. When the second DC signal DC2 approximately equals the target DC signal DCA, the second calculation circuit 120 stores the reference value corresponding to the updated adjustment signal Sad' in the storage circuit 118 for replacing the DC offset corresponding to the input power. After that, the storage circuit 118 outputs new calibration value in the updated content to the digital to analog converter 1204 according to the input power level of the received signal.

Figure 6:
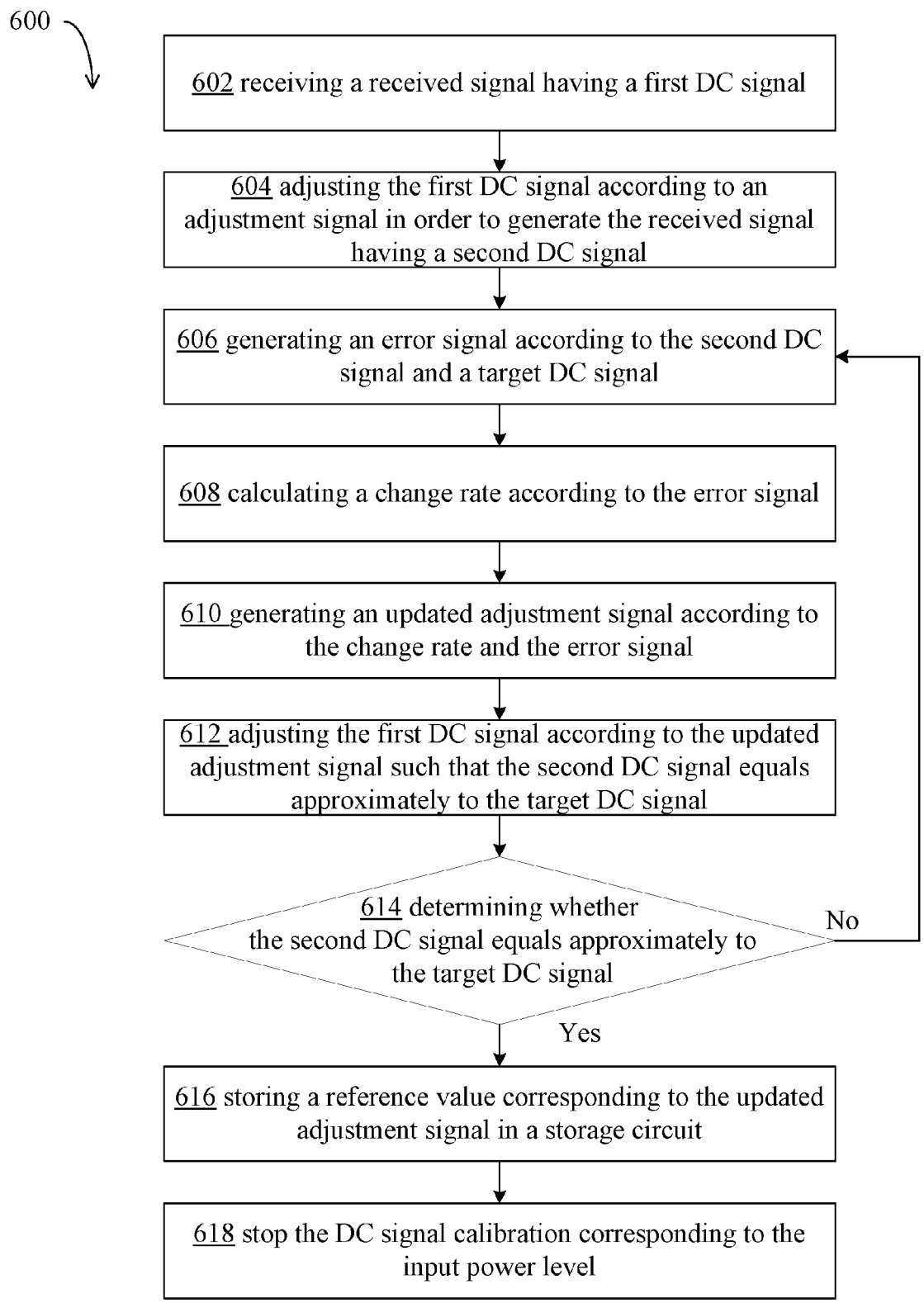
FIG. 6 is a flow chart diagram of an embodiment of a signal receiving method in accordance with the present invention.

In brief, the operating method of the embodiment of the signal receiving apparatus 100 could be summarized in the flow chart diagram as shown in FIG. 6. FIG. 6 is a flow chart diagram of an embodiment of a signal receiving method 600 in accordance with the present invention. The signal receiving method 600 is applicable in a wireless system. It is not required to strictly follow the order of steps shown in FIG. 6 to achieve equivalent results in general. Also, the steps shown in FIG. 6 are not required to be executed continuously. This means other functional steps could also be performed without departing from the scope of the present invention. The signal receiving method 600 comprises the following steps:

Step 602: receiving a received signal Sin having a first DC signal DC1;

Step 604: adjusting the first DC signal DC1 according to an adjustment signal Sad in order to generate the received signal Sin having a second DC signal DC2;

Step 606: generating an error signal Ser according to the second DC signal DC2 and a target DC signal DCA;

Step 608: calculating a change rate Serr according to the error signal Ser;

Step 610: generating an updated adjustment signal Sad' according to the change rate Serr and the error signal Ser;

Step 612: adjusting the first DC signal DC1 according to the updated adjustment signal Sad' such that the second DC signal DC2 equals approximately to the target DC signal DCA;

Step 614: determining whether the second DC signal DC2 approximately equals the target DC signal DCA. If so, go to Step 616; otherwise, go to Step 606;

Step 616: storing a reference value corresponding to the updated adjustment signal Sad' in a storage circuit 118;

Step 618: stop DC signal calibration corresponding to the input power level.

In summarized form, the embodiments of the present invention adjust DC signal of received signal by calculating the error and change rate between the DC signal of received signal and a target DC signal. Hence, the error between the DC signal of received signal and the target DC signal can be converged quickly to achieve DC offset compensation. As a result, the DC offset phenomena of the signal receiving apparatus in accordance with the present invention is improved.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A signal receiving apparatus, applicable in a wireless system, comprising:
    an adjustment circuit, configured to receive a received signal having a first direct current (DC) signal and to adjust the first DC signal according to an adjustment signal to generate an adjusted receiving signal having a second DC signal;
    a first calculation circuit, configured to generate an error signal according to a comparison of the second DC signal with a target DC signal, the first calculation circuit comprising:
        an analog to digital converter (ADC), configured to convert the second DC signal from analog form to digital form; and
        a first digital processing circuit, configured to calculate the error between the second DC signal and the target DC signal to generate the error signal, the first digital processing circuit comprising:
            a first logic circuit, configured to generate a differential calculus signal according to the second DC signal and a prior DC signal;
            a second logic circuit, configured to generate an integral calculus signal and the prior DC signal by operating integral calculus on the differential calculus signal; and
            a third logic circuit, configured to generate the error signal according to the integral calculus signal and the target DC signal; and
    a second calculation circuit, configured to generate a change rate according to the error signal and to update the adjustment signal according to the change rate and the error signal.

2. The signal receiving apparatus of claim 1, further comprising a storage circuit, wherein if it is determined that the second DC signal approximately equals the target DC signal, the second calculation circuit stores a reference value corresponding to the updated adjustment signal in the storage circuit.

3. The signal receiving apparatus of claim 2, wherein the first calculation circuit further generates an input power level signal, the signal receiving apparatus further comprising:
    a gain control circuit, configured to generate a gain control signal according to the input power level signal; and
    a variable gain amplifier, configured to generate the received signal by applying gain control on a first down-converted signal according to the gain control signal;
    wherein when the input power level signal of a second down-converted signal received by the signal receiving apparatus equals to the input power level signal of the first down-converted signal, the gain control circuit is further configured to control the storage circuit outputting the reference value to the second calculation circuit according to the input power level signal, and the second calculation circuit generates the updated adjustment signal according to the reference value.

4. The signal receiving apparatus of claim 1, further comprising:
    an oscillator, configured to generate an oscillation signal;
    an antenna, configured to receive a wireless signal to generate a radio frequency (RF) signal; and
    a mixer, configured to generate a first down-converted frequency signal according to the oscillation signal and the RF signal;
    wherein the RF signal is transmitted to the mixer via the antenna, and the mixer is further configured to mix the RF signal from the antenna and the oscillation signal from the oscillator to generate the first DC signal of the received signal.

5. The signal receiving apparatus of claim 1, wherein the target DC signal is a DC bias signal of the ADC.

6. The signal receiving apparatus of claim 1, wherein the second calculation circuit comprises:
    a second digital processing circuit, configured to generate the change rate according to the error signal and to generate the updated adjustment signal according to the change rate and the error signal; and
    a digital to analog (DAC) converter, configured to convert the updated adjustment signal from digital form to analog form and to transmit the updated adjustment signal in analog form to the adjustment circuit.

7. The signal receiving apparatus of claim 6, wherein the second digital processing circuit further comprises:
    a first logic circuit, configured to generate the change rate according to the error signal and a prior error signal;
    a second logic circuit, coupled to the first logic circuit, configured to generate an adjusted change rate according to the change rate and a first parameter;
    a third logic circuit, configured to generate an adjusted error signal according to the error signal and a second parameter; and
    a fourth logic circuit, coupled to the second and the third logic circuits, configured to update the adjustment signal according to the error signal, the adjusted change rate, the adjusted error signal, and a third parameter.

8. The signal receiving apparatus of claim 7, wherein the first logic circuit is a minus operator, which subtracts the prior error signal from the error signal to generate the change rate.

9. The signal receiving apparatus of claim 7, wherein the second logic circuit is a multiplier, which multiplies the change rate with the first parameter to generate the adjusted change rate.

10. The signal receiving apparatus of claim 7, wherein the third logic circuit is a multiplier, which multiplies the error signal with the second parameter to generate the adjusted error signal.

11. The signal receiving apparatus of claim 7, wherein the fourth logic circuit is configured to generate an integral calculus signal by operating integral calculus on the error signal, to adjust the integral calculus signal according to the third parameter to generate an adjusted integral calculus signal, and to accumulate the adjusted integral calculus signal, the adjusted change rate, and the adjusted error signal to update the adjustment signal.

12. The signal receiving apparatus of claim 1, wherein the first logic circuit is a minus operator, which subtracts the prior DC signal from the second DC signal to generate the differential calculus signal.

13. The signal receiving apparatus of claim 1, wherein the third logic circuit comprises a minus operator which subtracts the target DC signal from the integral calculus signal to generate the error signal.

14. A signal receiving method applicable to a wireless system, comprising:
receiving a received signal having a first DC signal and adjusting the first DC signal according to an adjustment signal to generate an adjusted received signal having a second DC signal;
generating an error signal according to a comparison of the second DC signal with a target DC signal;
calculating a change rate according to the error signal and updating the adjustment signal according to the change rate and the error signal;
storing a reference value corresponding to the updated adjustment signal in a storage circuit if it is determined that the second DC signal approximately equals the target DC signal;
generating an input power level signal according to the received signal;
generating a gain control signal according to the input power level signal;
generating the received signal by applying gain control on a first down-converted signal according to the gain control signal;
controlling the storage circuit outputting the reference value; and
updating the adjustment signal according to the reference value when the input power level signal of a received second down-converted signal equals to the input power level signal of the first down-converted signal.

15. The signal receiving method of claim 14, wherein the step of generating the error signal according to the second DC signal and the target DC signal further comprising:
converting the second DC signal from analog form to digital form; and
calculating the error between the second DC signal and the target DC signal to generate the error signal.

16. The signal receiving method of claim 15, wherein the step of calculating the change rate according to the error signal and updating the adjustment signal according to the change rate and the error signal further comprising:
calculating the change rate according to the error signal;
updating the adjustment signal according to the change rate and the error signal; and
converting the adjustment signal from digital form to analog form.

17. A signal receiving apparatus, applicable in a wireless system, comprising:
an adjustment circuit, configured to receive a received signal having a first direct current (DC) signal and to adjust the first DC signal according to an adjustment signal to generate an adjusted receiving signal having a second DC signal;
a first calculation circuit, configured to generate an error signal according to a comparison of the second DC signal with a target DC signal, the first calculation circuit comprising:
an analog to digital converter (ADC), configured to convert the second DC signal from analog form to digital form; and
a first digital processing circuit, configured to calculate the error between the second DC signal and the target DC signal to generate the error signal, the first digital processing circuit comprising:
a first logic circuit, configured to generate a differential calculus signal according to the second DC signal and a prior DC signal;
a second logic circuit, configured to generate an integral calculus signal and the prior DC signal by operating integral calculus on the differential calculus signal; and
a third logic circuit, configured to generate the error signal according to the integral calculus signal and the target DC signal; and
a second calculation circuit, configured to generate a change rate according to the error signal and to update the adjustment signal according to the change rate and the error signal, the second calculation circuit comprising:
a second digital processing circuit, configured to generate the change rate according to the error signal and to generate the updated adjustment signal according to the change rate and the error signal; and
a digital to analog (DAC) converter, configured to convert the updated adjustment signal from digital form to analog form and to transmit the updated adjustment signal in analog form to the adjustment circuit.

18. The signal receiving apparatus of claim 17, further comprising a storage circuit, wherein if it is determined that the second DC signal approximately equals the target DC signal, the second calculation circuit stores a reference value corresponding to the updated adjustment signal in the storage circuit.

19. The signal receiving apparatus of claim 17, further comprising:
an oscillator, configured to generate an oscillation signal;
an antenna, configured to receive a wireless signal to generate a radio frequency (RF) signal; and
a mixer, configured to generate a first down-converted frequency signal according to the oscillation signal and the RF signal;
wherein the RF signal is transmitted to the mixer via the antenna, and the mixer is further configured to mix the RF signal from the antenna and the oscillation signal from the oscillator to generate the first DC signal of the received signal.

20. The signal receiving apparatus of claim 17, wherein the target DC signal is a DC bias signal of the ADC.

* * * * *